(12) United States Patent
Rojo

(10) Patent No.: US 8,086,328 B2
(45) Date of Patent: Dec. 27, 2011

(54) SYSTEMS AND METHODS FOR VIBRATION RECTIFICATION ERROR REDUCTION IN CLOSED-LOOP ACCELEROMETER SYSTEMS

(75) Inventor: Donny Rojo, Everett, WA (US)

(73) Assignee: Honeywell International Inc., Morristown, NJ (US)

( * ) Notice: Subject to any disclaimer, the term of this patent is extended or adjusted under 35 U.S.C. 154(b) by 679 days.

(21) Appl. No.: 12/201,999

(22) Filed: Aug. 29, 2008

(65) Prior Publication Data

US 2010/0057224 A1    Mar. 4, 2010

(51) Int. Cl.
  *G05B 13/02* (2006.01)
  *G01P 15/13* (2006.01)
(52) U.S. Cl. .......... 700/42; 700/37; 73/1.38; 73/514.17; 73/514.18
(58) Field of Classification Search .............. 700/37, 700/40, 42; 73/1.38, 514.17, 514.18, 504.12
  See application file for complete search history.

(56) References Cited

U.S. PATENT DOCUMENTS

| | | | |
|---|---|---|---|
| 5,831,164 A | 11/1998 | Reddi et al. | |
| 2006/0065039 A1 | 3/2006 | Rojo et al. | |
| 2008/0000296 A1* | 1/2008 | Johnson | 73/514.18 |
| 2008/0011081 A1 | 1/2008 | Campbell et al. | |
| 2008/0138049 A1* | 6/2008 | Berkey et al. | 388/811 |
| 2009/0255336 A1* | 10/2009 | Horning et al. | 73/504.12 |
| 2009/0282916 A1* | 11/2009 | Modugno et al. | 73/504.12 |

OTHER PUBLICATIONS

Kraft, et al.; Closed-Loop Silicon Accelerometers; IEE Proceedings, Circuits Devices and Systems, Institution of Electrical Engineers, Stenvenage, GB; Oct. 5, 1998, pp. 325-331.

* cited by examiner

*Primary Examiner* — Ryan Jarrett
*Assistant Examiner* — Steven Garland
(74) *Attorney, Agent, or Firm* — Lowe Graham Jones PLLC

(57) ABSTRACT

Systems and methods for controlling a closed-loop accelerometer system. A system includes an accelerometer with a driver that responds in a nonlinear manner and a rebalancing controller in signal communication with the driver. The rebalancing controller includes a proportional-integral-derivative (PID) control portion having at least one variable gain component. A method includes sensing a movement of a proof mass, determining a static g field based on the sensed movement, setting at least one variable gain component of a PID controller based on the determined static g field, and rebalancing the proof mass using the PID controller.

19 Claims, 4 Drawing Sheets

SYSTEMS AND METHODS FOR VIBRATION RECTIFICATION ERROR REDUCTION IN CLOSED-LOOP ACCELEROMETER SYSTEMS

BACKGROUND OF THE INVENTION

Closed-loop accelerometer systems having nonlinear rebalancing drivers are subject to vibration rectification error (VRE) during random vibration operation. Proportional-Integral-Derivative (PID) controllers have been developed that can reduce the VRE in a 1 g static field. However, current PID controllers lose their effectiveness in reducing VRE when the accelerometer system experiences higher g static fields.

SUMMARY OF THE INVENTION

The present invention includes systems and methods for controlling a closed-loop accelerometer system to reduce VRE.

In accordance with an example embodiment of the invention, a system includes an accelerometer with a driver that responds in a nonlinear manner and a rebalancing controller in signal communication with the driver. The rebalancing controller includes a proportional-integral-derivative (PID) control portion having at least one variable gain component.

In accordance with other aspects of the invention, the driver is an electrostatic driver.

In accordance with still further aspects of the invention, the at least one variable gain component is selected from a proportional (P) component and a derivative (D) component.

In accordance with yet other aspects of the invention, the PID control portion of the rebalancing controller includes a variable P component and a variable D component with the variable P and D components based on a static field input.

In accordance with still another aspect of the invention, a method includes sensing a movement of a proof mass, determining a static g field based on the sensed movement, setting at least one variable gain component of a PID controller based on the determined static g field, and rebalancing the proof mass using the PID controller.

In accordance with still further aspects of the invention, setting includes setting at least one variable gain component selected from a proportional (P) component and a derivative (D) component of the PID controller.

In accordance with yet another aspect of the invention, rebalancing the proof mass using the PID controller includes sending a control signal to a driver that responds in a nonlinear manner.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
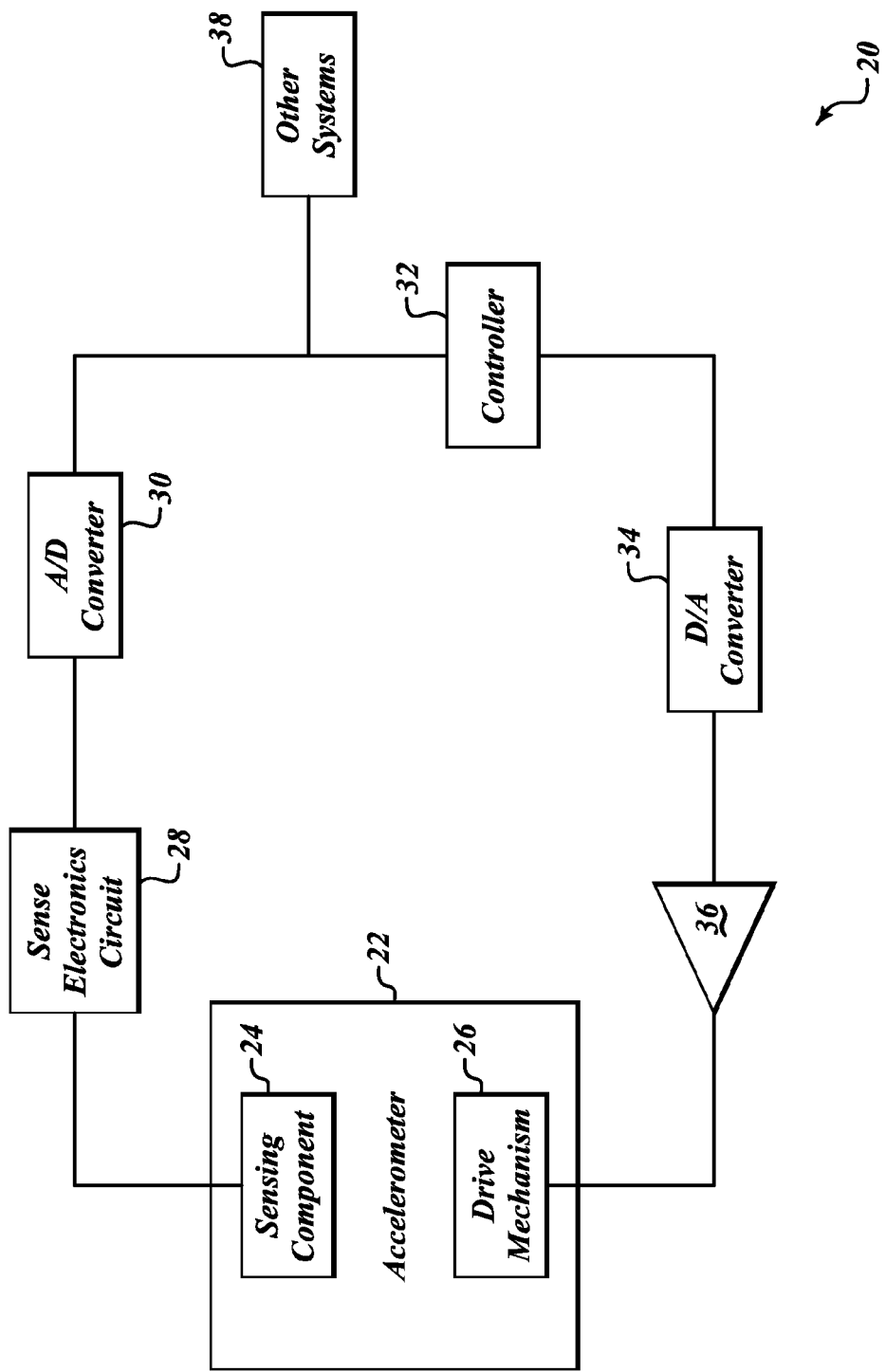
FIG. 1 is a diagram of an accelerometer system in accordance with an example embodiment of the invention.

FIG. 1 is a diagram of an accelerometer system 20 in accordance with an example embodiment of the invention. The accelerometer system 20 includes an accelerometer 22 having at least one sensing component 24, such as a sense plate, and at least one drive mechanism 26 that responds to drive signals in a nonlinear manner. The drive mechanism 26 includes an electrostatic capacitive drive mechanism in an example embodiment. Various types of accelerometers, such as microelectromechanical (MEMS) based accelerometers and in particular MEMS based accelerometers having a teeter-totter type construction may be used, for example. A sense electronics circuit 28 (details not shown) is in signal communication with the sensing component 24. The sense electronics circuit 28 may amplify and filter signals from the sensing component 24, for example. In the example embodiment shown, the sense electronics circuit 28 is an analog circuit that provides an output to an analog to digital (A/D) converter 30 that digitizes the amplified and filtered signal from the sense electronics 26.

A controller 32 receives the digital signal from the A/D converter 30 and generates control signals that are converted by a digital to analog (D/A) converter 34. An amplifier 36 takes the output of the D/A converter 34 as an input and amplifies the signal before it is output to the drive mechanism 26. The controller 32 includes a proportional-integral-derivative (PID) control component with variable proportional (P) and derivative (D) gain components in an example embodiment. In one example, the P and D gain components are based on a predetermined linear relationship of optimal P and D gain over a range of frequencies, such as 50 Hertz (Hz) to 400 Hz, in relation to a static g field experienced by the accelerometer system 20. In an example embodiment, the predetermined linear relationship of optimal P and D gain is based on a particular optimal P value and a particular optimal D value at each static g field level that minimizes VRE over a range of frequencies, with the linear relationship being defined by a change in the particular optimal P and D values over a range of static g field levels, such as 1 g to 4 g. By using variable P and D gain components based on a predetermined linear relationship of optimal P and D gain for a range of frequencies over a range of static g field levels, the controller 32 can reduce VRE in a more effective manner over a range of static g fields than previous PID controllers with constant P and D values that are typically optimized for a particular static g field level. Although the linear relationship is defined over a range of static g field levels from 1 g to 4 g in this example embodiment, the controller 32 is capable of operation outside this range in some embodiments, such as from 0 g to a predetermined maximum static field level, while still using the predetermined linear relationship of optimal P and D gain based on the 1 g to 4 g range. The linear relationship may be determined using different static g field ranges in other embodiments.

Figure 2:
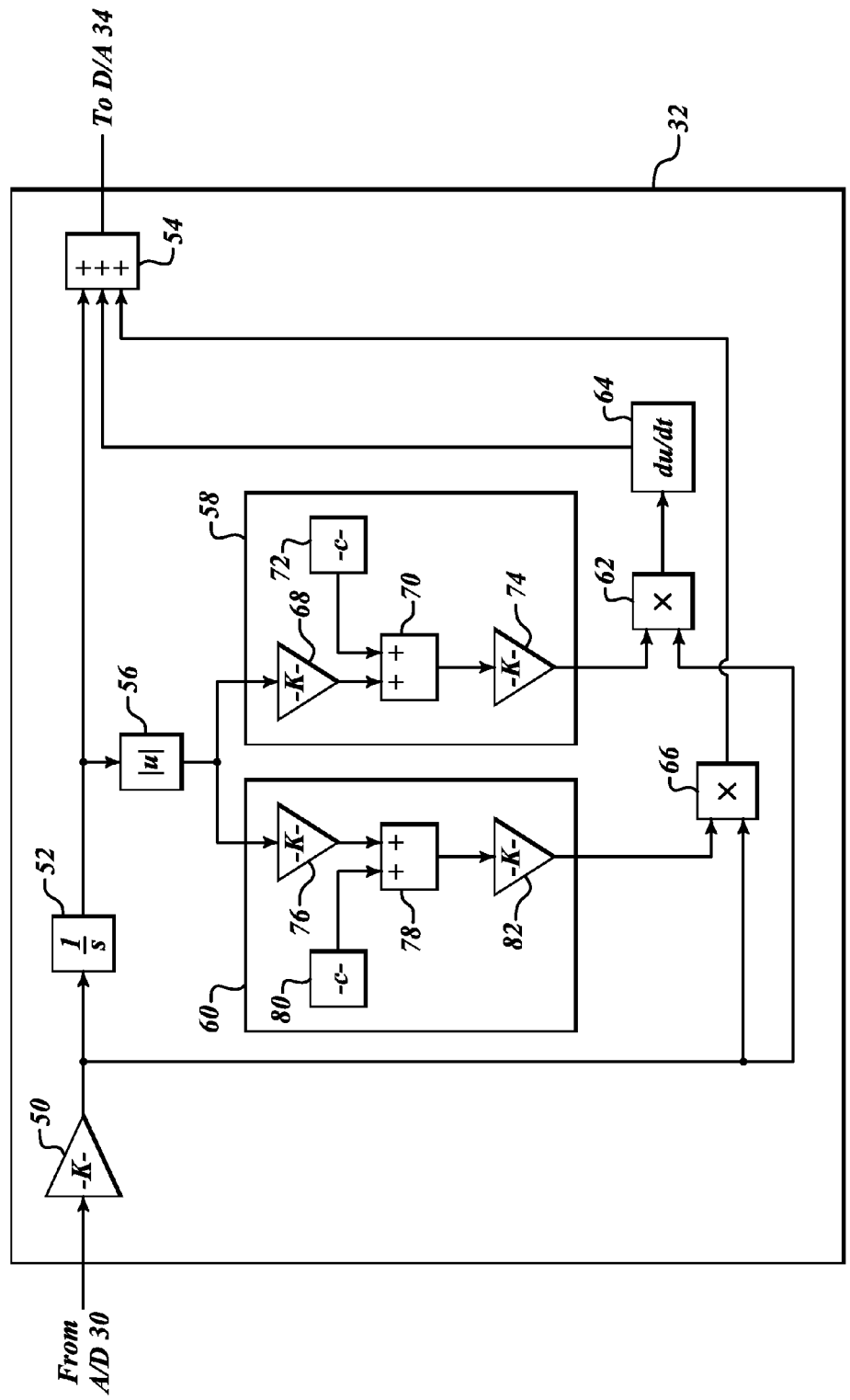
FIG. 2 is a diagram showing additional detail for some controller components of the accelerometer system of FIG. 1 in accordance with an example embodiment of the invention.

FIG. 2 is a diagram showing additional detail for the controller 32 of the accelerometer system of FIG. 1 in accordance with an example embodiment of the invention. The components of the controller 32 shown in FIG. 2 may be implemented using analog or digital components, and may be implemented using a combination of software and hardware or in hardware alone. A first amplifier 50 takes a signal from the A/D converter 30 as input and amplifies the signal with a predetermined main gain value to generate a main amplified signal output. An integrator 52 is in signal communication with the first amplifier 50. The integrator 52 integrates the main amplified signal output to generate an integrator output.

A first adder 54 accepts three inputs, including the integrator output as a first input. An absolute value component 56 is also in signal communication with the integrator output. The absolute value component 56 takes the integrator output as an input and generates an integrator output magnitude.

A variable derivative gain component 58 takes the integrator output magnitude from the absolute value component 56 as an input and generates a variable derivative gain. A first multiplier 62 accepts the variable derivative gain and the main amplified signal output as inputs to generate an intermediate main derivative gain signal. A derivative component 64 accepts the intermediate main derivative gain signal as an input and generates a main derivative gain signal based on a derivative of the intermediate main derivative gain signal. The main derivative gain signal is used as a second input at the first adder 54.

A variable proportional gain component 60 also takes the integrator output magnitude as an input and generates a variable proportional gain. A second multiplier 66 accepts the variable proportional gain and the main amplified signal as inputs and generates a main variable proportional gain signal. The main variable proportional gain signal is used as a third input at the first adder 54. The first adder 54 sums the integrator output, the main variable derivative gain signal, and the main variable proportional gain signal to generate a summed control signal that is provided to the D/A converter 34.

In an example embodiment, the variable derivative gain generated by the variable derivative gain component 58 is described by the equation $D_{gain}(g_{control}) = (M_{Dgain} \cdot |g_{control}| + B_{Dgain}) \cdot 1/(\omega_n^2)$ and the variable proportional gain generated by the variable proportional gain component 60 is described by the equation $P_{gain}(g_{control}) = (M_{Pgain} \cdot |g_{control}| + B_{Pgain}) \cdot 1/(\omega_n \cdot Q)$, with $g_{control}$ corresponding to the integrator output from the integrator 52 and $|g_{control}|$ corresponding to the integrator output magnitude. $M_{Dgain}$ and $B_{Dgain}$ are based on a previously determined linear relationship of optimal derivative gain in relation to static field and $M_{Pgain}$ and $B_{Pgain}$ are based on a previously determined linear relationship of optimal proportional gain in relation to static field. In the equations above, $\omega_n$ is the accelerometer 22 natural frequency, $\omega_n^2$ is the accelerometer 22 natural frequency squared, and Q is the damping factor of the accelerometer 22.

In an example embodiment, the variable derivative gain component 58 includes an initial derivative gain amplifier 68 that amplifies the integrator output magnitude by a factor of $M_{Dgain}$ to generate an initial derivative gain output. A derivative gain adder 70 sums two inputs to generate a summed derivative gain output. The initial derivative gain output is taken as a first input by the derivative gain adder 70 and a value of $B_{Dgain}$ is taken as a second input from a storage component 72 in signal communication with the derivative gain adder 70. The storage component 72 may be a non-volatile memory device, for example. The summed derivative gain output is amplified at a final derivative gain amplifier 74 by a factor of $1/(\omega_n^2)$ to generate the variable derivative gain.

In an example embodiment, the variable proportional gain component 60 includes a first proportional gain amplifier 76 that amplifies the integrator output magnitude by a factor of $M_{Pgain}$ to generate a first proportional gain output. A proportional gain adder 78 sums two inputs to generate a summed proportional gain output. The first proportional gain output is taken as a first input by the proportional gain adder 78 and a value of $B_{Pgain}$ is taken as a second input from a storage component 80 in signal communication with the proportional gain adder 78. The storage component 80 may be a non-volatile memory device, for example. The summed proportional gain output is amplified at a second proportional gain amplifier 82 by a factor of $1/(\omega_n \cdot Q)$ to generate the variable proportional gain.

Figure 3:
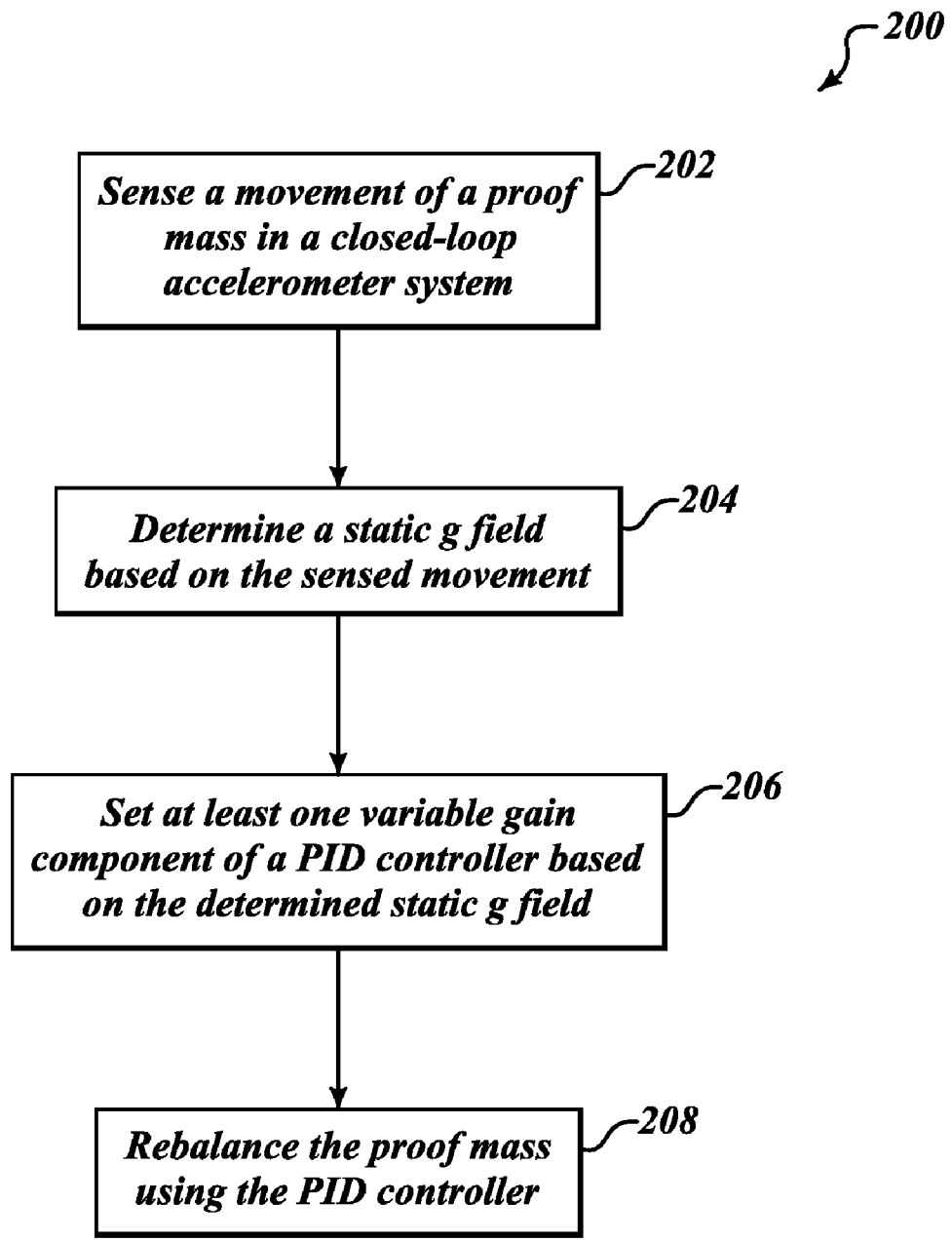
FIG. 3 is a flowchart of a method of controlling a closed-loop accelerometer system in accordance with an example embodiment of the invention.

FIG. 3 is a flowchart of a method 200 of controlling the closed-loop accelerometer system 20 in accordance with an example embodiment of the invention. First, at a block 202, a movement of a proof mass is sensed, such as with the sensing component 24 and the sense electronics 28, for example. Then, at a block 204, a static g field is determined based on the sensed movement. Next, at a block 206, at least one variable gain component of a PID controller, such as the controller 32, for example, is set based on the determined static g field. Then, at a block 208, the proof mass is rebalanced using the PID controller. In an example embodiment, setting at least one variable gain component includes setting a variable P component and a variable D component of the PID controller based on a predetermined linear relationship of optimal proportional and derivative gain factors to static g field magnitude. In some example embodiments, rebalancing the proof mass using the PID controller includes sending a control signal to an electrostatic driver that responds in a nonlinear manner, such as the drive mechanism 26.

Figure 4:
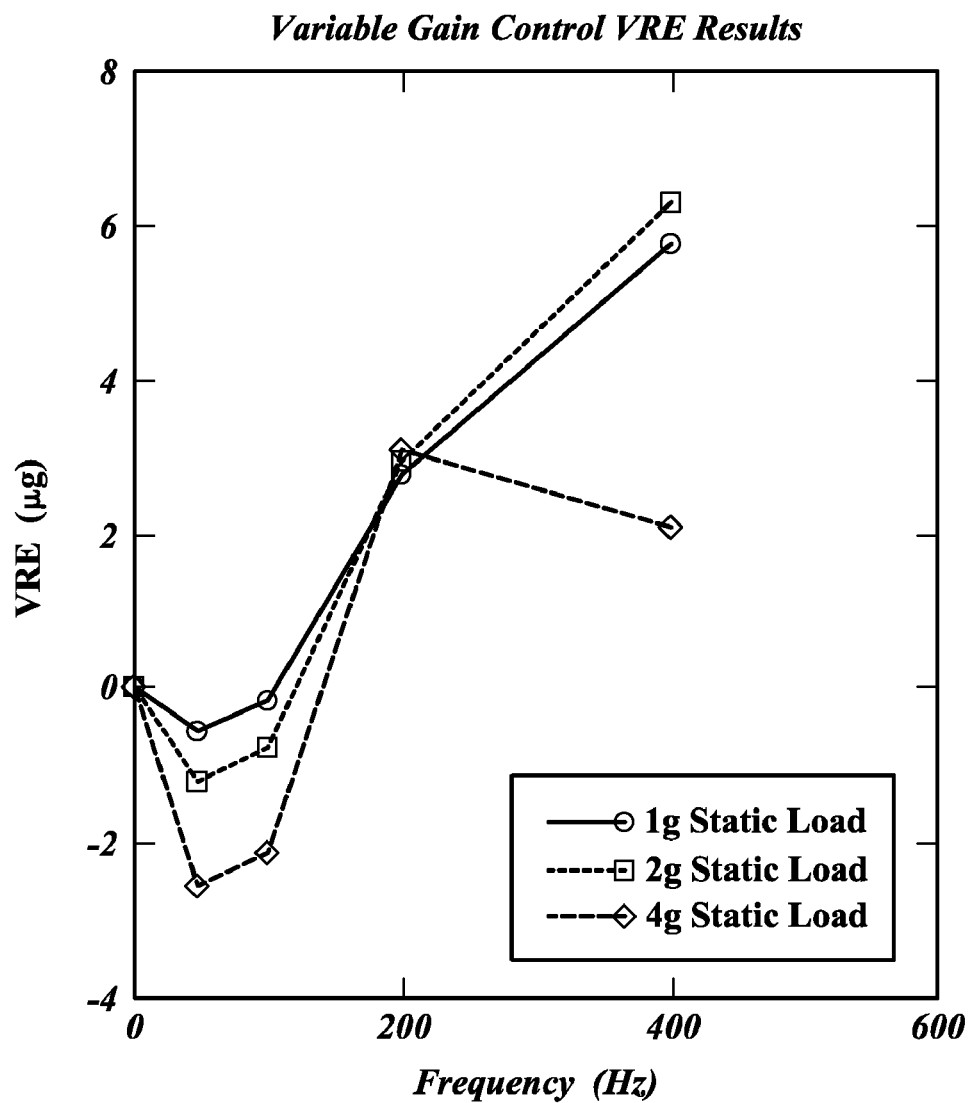
FIG. 4 is a chart showing VRE vs. frequency for various static g levels in a modeled accelerometer system that includes a variable gain PID controller in accordance with an embodiment of the invention.

FIG. 4 is a chart showing VRE in micro g (μg) vs. frequency in Hz. for various static g levels in a modeled accelerometer system similar to the accelerometer system 20 that includes a variable gain PID controller similar to the controller 32 in accordance with an embodiment of the invention.

While the preferred embodiment of the invention has been illustrated and described, as noted above, many changes can be made without departing from the spirit and scope of the invention. For example, the controller 32 may be implemented using various combinations of analog and digital hardware and/or software that may include microcontrollers, field programmable gate arrays (FPGAs), application specific integrated circuits (ASICs), or systems on a chip (SOCs), for example. Additionally, in some embodiments, different numbers of derivative and/or proportional gain amplifiers than those described with reference to FIG. 2 may be used. Also, the systems and methods may be based on a predetermined linear relationship of P and D gain values over a frequency range other than 50 to 400 Hz and g field values of 1 g to 4 g in some embodiments. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A closed-loop accelerometer system comprising:
   an accelerometer including a driver that responds in a nonlinear manner; and
   a rebalancing controller in signal communication with the driver, the controller comprising a proportional-integral-derivative (PID) control portion having at least one variable gain component,
   the controller is configured to rebalance the accelerometer in response to the accelerometer being out of balance due to an experienced force,
   the at least one variable gain component having a gain setting based on a previously determined static gravitational field input value.

2. The system of claim 1, wherein the driver is an electrostatic driver.

3. The system of claim 1, wherein the at least one variable gain component is selected from a variable proportional (P) gain component and a variable derivative (D) gain component.

4. The system of claim 3, wherein the PID control portion of the rebalancing controller includes a variable P gain component and a variable D gain component.

5. The system of claim 4, wherein the variable P and D gain components are based on a predetermined linear relationship of optimal proportional and derivative gain factors to the static gravitational field input value.

6. The system of claim 1, wherein the PID control portion includes analog electronics.

7. The system of claim 1, wherein the PID control portion is implemented using digital electronics.

8. The system of claim 7, wherein the PID control portion includes a microcontroller.

9. The system of claim 7, wherein the PID control portion includes a field programmable gate array (FPGA).

10. A method of controlling a closed-loop accelerometer system, the method comprising:
    sensing a movement of a proof mass;
    determining a static gravitational field based on the sensed movement;
    setting at least one variable gain component of a proportional-integral-derivative (PID) controller based on the determined static gravitational field; and
    rebalancing the proof mass using the PID controller.

11. The method of claim 10, wherein setting comprises setting at least one variable gain component selected from a variable proportional (P) gain component and a variable derivative (D) gain component of the PID controller.

12. The method of claim 11, wherein setting further comprises setting a variable P gain component and a variable D gain component of the PID controller.

13. The method of claim 12, wherein setting further comprises setting the variable P gain component and the variable D gain component based on a predetermined linear relationship of optimal proportional and derivative gain factors to static gravitational field magnitude.

14. The method of claim 10, wherein rebalancing the proof mass using the PID controller includes sending a control signal to a driver that responds in a nonlinear manner.

15. The method of claim 14, wherein rebalancing includes sending a control signal to an electrostatic driver.

16. A system for controlling a closed-loop accelerometer comprising:
    sensing means for sensing movement of a proof mass;
    static gravitational field determining means for determining a static gravitational field based on the sensed movement of the proof mass;
    variable gain component setting means for setting at least one variable gain component of a PID (proportional-integral-derivative) controller based on the determined static gravitational field; and
    rebalancing means for rebalancing the proof mass using the PID controller.

17. The system of claim 16, wherein the variable gain component setting means is configured to set at least one variable gain component selected from a variable proportional (P) gain component and a variable derivative (D) gain component of the PID controller.

18. The system of claim 17, wherein the variable gain component setting means is further configured to set a variable P gain component and a variable D gain component of the PID controller.

19. The system of claim 18, wherein the variable gain component setting means is further configured to set the variable P gain component and the variable D gain component based on a predetermined linear relationship of optimal proportional and derivative gain factors to static gravitational field magnitude.

* * * * *